US006328636B1

(12) United States Patent
Yoshimi et al.

(10) Patent No.: US 6,328,636 B1
(45) Date of Patent: Dec. 11, 2001

(54) DEVICE AND METHOD FOR MACHINING IN WHICH COOL AIR COOLING IS USED

(75) Inventors: Takayuki Yoshimi; Naoto Ono; Ryohei Mukai, all of Kariya; Yasunori Kobayashi, Toyota; Masaaki Sato, Toyota; Tadashi Kumazawa, Toyota; Yuji Kubo, Nagoya; Masanori Matsumoto, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/582,410

(22) PCT Filed: Dec. 22, 1998

(86) PCT No.: PCT/JP98/05795

§ 371 Date: Jun. 26, 2000

§ 102(e) Date: Jun. 26, 2000

(87) PCT Pub. No.: WO99/33616

PCT Pub. Date: Jul. 8, 1999

(30) Foreign Application Priority Data

Dec. 24, 1997 (JP) .................................................. 9-366020

(51) Int. Cl.$^7$ ........................................................ B24B 1/00
(52) U.S. Cl. ............................ 451/56; 451/443; 451/449
(58) Field of Search .................................. 451/53, 28, 56, 451/242, 243, 251, 443, 449, 450

(56) References Cited

U.S. PATENT DOCUMENTS

| 3,696,564 | 10/1972 | Joyce . | |
|---|---|---|---|
| 3,834,088 | 9/1974 | Matson . | |
| 4,315,384 | 2/1982 | Roos . | |
| 4,557,078 | * 12/1985 | Brill ......................................... | 451/56 |
| 5,472,371 | * 12/1995 | Yamakura et al. ..................... | 451/56 |
| 5,562,526 | * 10/1996 | Yoneda et al. ............................ | 451/9 |

FOREIGN PATENT DOCUMENTS

| 1 546 590 | 5/1979 | (GB) . |
|---|---|---|
| 50-84981 | 7/1975 | (JP) . |
| 1-2676 | 1/1976 | (JP) . |
| 52-17293 | 2/1977 | (JP) . |
| 52-39876 | 3/1977 | (JP) . |
| 56-9166 | 1/1981 | (JP) . |
| 57-100453 | 6/1982 | (JP) . |
| 60-25653 | 2/1985 | (JP) . |
| 60-28635 | 7/1985 | (JP) . |
| 61-164779 | 7/1986 | (JP) . |
| 63-35574 | 3/1988 | (JP) . |
| 63-62339 | 12/1988 | (JP) . |
| 1-153257 | 6/1989 | (JP) . |
| 1-121650 | 8/1989 | (JP) . |
| 2-30203 | 8/1990 | (JP) . |
| 2-237766 | 9/1990 | (JP) . |
| 2-269562 | 11/1990 | (JP) . |
| 3-49860 | 3/1991 | (JP) . |
| 4-48584 | 8/1992 | (JP) . |
| 5-84637 | 4/1993 | (JP) . |
| 5-169345 | 7/1993 | (JP) . |
| 5-301160 | 11/1993 | (JP) . |
| 6-59624 | 8/1994 | (JP) . |
| 7-32245 | 2/1995 | (JP) . |
| 7-132462 | 5/1995 | (JP) . |
| 2568975 | 10/1996 | (JP) . |

* cited by examiner

Primary Examiner—Derris H. Banks
(74) Attorney, Agent, or Firm—Burns, Doane, Swecker & Mathis, LLP

(57) ABSTRACT

A cold-gas-blow-cooling type machining apparatus in which a cold gas blow is provided to cool a machining tool and a workpiece while the workpiece is machined by the machining tool. The machining apparatus includes: a rectifying device which rectifies the machining tool; a workpiece-temperature detecting device which detects a temperature of the workpiece; and a rectifying-device control device which controls an operation of the rectifying device on the basis of the temperature of the workpiece which is detected by the workpiece-temperature detecting device.

17 Claims, 6 Drawing Sheets

DEVICE AND METHOD FOR MACHINING IN WHICH COOL AIR COOLING IS USED

TECHNICAL FIELD

The present invention relates to machining apparatus and process in which a cold-gas-blow cooling is used.

BACKGROUND ART

JP-A-60-25653 discloses a grinding apparatus wherein a load current of an electric motor for rotating a grinding wheel is measured so as to determine a point of time at which the grinding wheel is to be dressed. The grinding resistance increases as the grinding wheel becomes dull, resulting in an increased load applied to the grinding wheel and the consequently increased amount of heat generation. The increased load applied to the grinding wheel or the increased amount of heat generation causes changes in the hardness, residual stress and other mechanical properties of a workpiece subjected to the grinding operation. In this view, where the grinding wheel has become dull to a certain extent, the grinding wheel is dressed so as to restore its original sharpness. However, in the grinding apparatus disclosed in JP-A-60-25653 in which the point of time of the dressing operation is determined on the basis of change of the measured load current of the electric motor for rotating the grinding wheel, the determined dressing time does not always coincide with a dressing time suitable for the workpiece.

On the other hand, if the hardness and residual stress of the workpiece are directly measured, it would be possible to determine the dressing time suitable for the workpiece, on the basis of the measured hardness and residual stress. However, the hardness and the residual stress of the workpiece cannot be measured while the grinding operation is in process. The workpiece has to be removed from the machining apparatus, so that the hardness and the residual stress are measured by measurement devices which are independent of the machining apparatus. Since the workpiece has to be removed from the machining apparatus, the working efficiency is problematically reduced. Further, although the hardness and the residual stress of each workpiece are measured simultaneously with the grinding operation for the next workpiece, the measurement of the residual stress generally requires a long time, resulting in a delay in the point of time of the dressing operation and a risk of producing some defective products.

Such a problem arises also in a cutting operation. When the cutting tool becomes dull, the surface smoothness of the workpiece is deteriorated. Further, the cutting resistance increases thereby resulting in increased elastic deformation of the workpiece and the cutting tool, or increased thermal expansion of the workpiece and the cutting tool due to increased amount of heat generation. Either one of the increased elastic deformation and the increased thermal expansion causes deterioration in the machining accuracy. In view of this, it is preferable that the cutting tool be re-ground at a time suitable for the workpiece, so that the cutting tool restores its original sharpness at the time suitable for the workpiece.

The above-described problems are important particularly in a machining process with cold-gas-blow cooling. In the machining process with cold-gas-blow cooling, a blow of cold gas (a stream of a gas having a low temperature) is used instead of a cutting or grinding liquid or other liquid coolant, so as to be applied to a machining point at which the workpiece is machined by the machining tool, thereby cooling the machining point, as described in, for example, JP-A-56-9166. This machining process has recently begun to be practiced in view of freedom from splashes of the liquid coolant, easier recycling of the cutting chips, and other advantages thereof. However, since the gas has a lower thermal conductivity and a smaller thermal capacity than those of the liquid, the machining tool and the workpiece tend to be insufficiently cooled in this machining process. Thus, the increased amount of heat generation derived from the deterioration of the sharpness of the machining tool is likely to affect the mechanical properties of the workpiece and the machining accuracy. Therefore, it is particularly important that the dressing of the grinding wheel, the re-grinding of the cutting tool, or other rectification of the machining tool be executed at the time suitable for the workpiece.

DISCLOSURE OF INVENTION

The object of the present invention is to permit rectification of a machining tool at a point of time suitable for the workpiece in a machining process with cold-gas-blow cooling. This object may be achieved by a machining apparatus or process according to any one of the following modes of the present invention, which are numbered and dependent from each other, where appropriate. It is to be understood that the following modes are provided to facilitate the understanding of the present invention, and that the technical features and the combinations of the technical features disclosed in the present specification are not limited to the following modes.

(1) A cold-gas-blow-cooling type machining apparatus in which a cold gas blow is provided to cool a machining tool and a workpiece while the workpiece is machined by the machining tool, the machining apparatus being characterized by comprising:

a rectifying device which rectifies the machining tool;

a workpiece-temperature detecting device which detects a temperature of the workpiece; and a rectifying-device control device which controls an operation of the rectifying device on the basis of the temperature of the workpiece which is detected by the workpiece-temperature detecting device.

In the cold-gas-blow-cooling type machining apparatus of the present mode, the operation of the rectifying device is controlled on the basis of the temperature of the workpiece. As described above, where the cold gas blow is used for cooling the machining tool and the workpiece, deterioration of the sharpness of the machining tool affects the temperature of the workpiece more considerably than where a liquid coolant is used. Where the rectifying device is controlled on the basis of the temperature of the workpiece, the machining tool is rectified at a point of time suitable for the workpiece, so that the sharpness of the machining tool is restored at the suitable time, making it possible to reduce the number of defective products due to inadequate rectification of the machining tool.

The rectifying-device control device may include, for example, a machining-condition lightening portion which reduces a relative movement velocity of the machining tool and the workpiece, and a depth of cut per pass, by respective predetermined amounts, each time the detected temperature of the workpiece rises to a predetermined temperature, and a rectifying-operation command portion which commands the rectifying device to perform a rectifying operation when the relative movement velocity or the depth of cut is reduced to a predetermined velocity or depth of cut. (It is noted that each of the above-described predetermined amounts may be constant, or alternatively may be changed depending upon the situation. In the latter case, each of the predetermined amounts may be larger where the detected temperature rises to the predetermined temperature a short time after the detected temperature rose to the predetermined temperature last time, than where the detected temperature rises to the predetermined temperature a long time after the detected temperature rose to the predetermined temperature last time.) That is, the rectifying-device control device may be adapted to thus control the rectifying device indirectly on the basis of the detected temperature of the workpiece. Further, alternatively, the rectifying-device control device may be adapted to control the rectifying device directly on the basis of the detected temperature of the workpiece. One example of the latter case is recited as mode (2) described below.

(2) A cold-gas-blow-cooling type machining apparatus according to mode (1), wherein the rectifying-device control device includes a rectifying-operation command portion which commands the rectifying device to rectify the machining tool when the temperature of the workpiece rises to a rectification requiring temperature.

The rectifying-operation command portion is thus adapted to command the rectifying device to effect the rectifying operation when the temperature of the workpiece rises to the rectification requiring temperature, thereby making it possible to execute a suitable rectification of the machining tool with a simple control.

(3) A cold-gas-blow-cooling type machining apparatus according to mode (1) or (2), wherein the rectifying-device control device includes a mechanical-property-basis determining portion which determines the rectification requiring temperature on the basis of a relationship between the temperature of the workpiece and a mechanical property of the workpiece.

The mechanical property may correspond to, for example, a residual stress or a hardness of a surface layer portion of the workpiece. The relationship between the detected temperature of the workpiece and the mechanical property may be obtained in advance through, for example, an experiment. The obtained relationship is then stored in a memory portion of a computer which constitutes the rectifying-device control device. When the rectifying-device control device is provided with desired mechanical-property-related values which relate to desired values of the mechanical property, from an input device operated by an operator, or from a host computer having various information, the rectification requiring temperature is determined by the mechanical-property-basis determining portion such that the desired mechanical-property-related values are established. The desired mechanical-property-related values may be interpreted to include not only a value of the mechanical property per se, but also a value indicating that the mechanical property is high, middle or low, or a value indicating whether the mechanical property should be taken into account or not. According to the present mode, the machining tool is rectified at a point of time suitable, particularly, for the workpiece.

(4) A cold-gas-blow-cooling type machining apparatus according to mode (3), wherein the mechanical property includes a residual stress in a surface layer portion of the workpiece.

In the cold-gas-blow-cooling type machining apparatus recited in the present mode, the point of time to rectify the machining tool is determined on the basis of the detected temperature of the workpiece and also the relationship between the temperature and the residual stress of the workpiece. The relationship between the temperature and the residual stress of the workpiece is established on the basis of machining conditions (including a cooling condition) in the machining apparatus, physical characteristics of the workpiece, condition of surface treatment applied to the workpiece, and some other factors. The relationship is shown in FIG. 4, by way of example. As shown in the figure, a residual compressive stress is reduced with a rise of the temperature of the workpiece during the machining operation. The reduction in the residual compressive stress leads to a reduction in fatigue strength of the workpiece and a consequently increased possibility of fatigue failure of the workpiece. A value of the residual compressive stress in the workpiece after the machining operation is suitably determined depending upon the purpose of use of the workpiece. The thus determined value of the residual stress will be referred to as a desired residual stress value. The value of the residual compressive stress is represented by a negative value, while the value of the residual tensile stress is represented by a positive value. Where the desired residual stress value corresponds to an allowable value of the residual stress, the desired residual stress value will be referred to as an allowable residual stress value. If the machining tool is rectified to restore its sharpness on the basis of the temperature of the workpiece, in view of the fact that the temperature rises as the machining tool becomes dull, the residual stress in the machined workpiece can be prevented from becoming larger than the desired residual stress value. Described specifically, for example, the relationship between the detected temperature of the workpiece and the residual stress in the workpiece is obtained in advance through an experiment, and the obtained relationship is stored in the memory portion of the computer which constitutes the rectifying-device control device. When the rectifying-device control device is provided with desired residual-stress-related values which relate to the desired residual stress value, from an input device operated by an operator, or from a host computer having various information, the rectification requiring temperature corresponding to the desired residual stress value is automatically determined by a residual-stress-basis determining portion, so that the machining tool is automatically rectified at the time when the detected temperature rises to the rectification requiring temperature. The desired residual-stress-related values can be considered similarly as the desired mechanical-property-related values. That is, the desired residual-stress-related values may be interpreted to include not only a value of the residual stress per se, but also a value indicating that the residual stress is high, middle or low, or a value indicating whether the residual stress should be taken into account or not. According to the machining apparatus of the present mode, it is possible to prevent the residual stress in the workpiece from becoming larger than the desired residual stress value due to the rise in the temperature of the workpiece caused by deterioration of the sharpness of the machining tool.

(5) A cold-gas-blow-cooling type machining apparatus according to mode (1) or (2), wherein the rectifying-device control device includes a machining-resistance-basis determining portion which determines the rectification requiring temperature on the basis of a relationship between a machining resistance applied to the machining tool from the workpiece and the temperature of the workpiece.

Deterioration of the sharpness of the machining tool deteriorates dimensional accuracy, surface smoothness of the workpiece and some other quality of the machined workpiece, and also increases the machining resistance applied to the machining tool from the workpiece. In this view, if an allowable value of the machining resistance which assures an allowable quality of the machined workpiece is obtained, it is possible to determine the rectification requiring temperature which corresponds to the allowable value of the machining resistance. Between the machining resistance and the temperature of the workpiece, there is a relationship as shown in FIG. 7 by way of example. Thus, it is possible to obtain in advance the rectification requiring temperature, which corresponds to the temperature of the workpiece at the time when the actual value of the machining resistance is increased to the allowable value of the machining resistance, on the basis of this relationship between the machining resistance and the temperature of the workpiece. The machining tool is rectified when the detected temperature of the workpiece rises to the rectification requiring temperature, so as to restore its sharpness at the suitable point of time, thereby preventing an excessive increase in the machining resistance.

Described specifically, the relationship between the detected temperature of the workpiece and the machining resistance may be obtained in advance through, for example, an experiment. The obtained relationship is stored in the memory portion of the computer which constitutes the rectifying-device control device. When the rectifying-device control device is provided with target machining-resistance-related amounts which relate to a target amount of the machining resistance, from the input device operated by the operator, or from the host computer having various information, the rectification requiring temperature is determined by the machining-resistance-basis determining portion so that the machining tool is rectified at the time when the machining resistance is increased to a value corresponding to the target machining-resistance-related amount. The machining tool can be thus rectified at the suitable point of time, since deterioration of the sharpness of the machining tool is sensitively reflected on the temperature of the workpiece in the machining with cold-gas-blow cooling. The machining resistance, in general, can be detected more accurately based on the temperature of the workpiece, than based on the value of current supplied to an electric motor for driving the machining tool or the workpiece. That is, in the machining apparatus according to the present mode, the rectification of the machining tool can be performed at the suitable point of time.

(6) A cold-gas-blow-cooling type machining apparatus according to any one of modes (1)–(5), wherein the workpiece-temperature detecting device includes a detecting portion opposed to a vicinity of a machining point at which the workpiece is machined by the machining tool.

The temperature in the vicinity of the machining point reflects the condition of the sharpness of the machining tool more sensitively than that in any other portion of the surface of the workpiece. Thus, it is preferable that the detecting portion of the temperature detecting device be provided so as to be opposed to the vicinity of the machining point. It is particularly preferable that the detecting portion be opposed to a portion which is adjacent to the machining point and which is on the downstream side of the machining point as viewed in a direction in which the surface of the workpiece is moved relative to the machining tool. Where the workpiece is rotated so as to be machined at its outer or inner circumferential surface, the detecting portion of the temperature detecting device is adapted to be opposed to the corresponding one of the outer and inner circumferential surfaces.

The temperature detecting device may include a contact-type surface-temperature detecting device which is adapted to detect the temperature of the surface of the workpiece with the detecting portion being brought into contact with the surface of the workpiece, or alternatively may include a non-contact-type surface-temperature detecting device which is adapted to detect the temperature on the basis of a radiant energy radiated from the workpiece. Since the workpiece radiates an electromagnetic wave having a wavelength distribution and an intensity which vary depending upon the temperature of the workpiece, the non-contact-type surface-temperature detecting device can detect the temperature of the workpiece without contact thereof with the workpiece, for example, by detecting a rise of the temperature of a subject body which is irradiated with the electromagnetic wave, or by detecting the intensity or wavelength of the electromagnetic wave. The non-contact-type surface-temperature detecting device may be a radiation thermometer or a thermography, for example.

(7) A cold-gas-blow-cooling type machining apparatus according to mode (6), further comprising a spindle which holds the workpiece and rotates the workpiece about an axis of the workpiece, and wherein the detecting portion is opposed to a point that lies on a circle on which the machining point lies and that is spaced apart from the machining point circumferentially of the workpiece, the circle having a center on the axis.

In the cold-gas-blow-cooling type machining apparatus recited in the present mode, the temperature detecting device detects the temperature at the point that lies on the circle on which the machining point lies and that is circumferentially spaced apart from the machining point. In the present machining apparatus, the temperature of the heat generation as a result of the machining operation can be detected more accurately and immediately than where the temperature at a point axially spaced apart from the machining point is detected.

(8) A cold-gas-blow-cooling type machining apparatus according to any one of modes (1) to (7), further comprising a rotary driving device, and wherein the machining tool includes a grinding wheel which is rotated by the rotary driving device, and wherein the rectifying device includes a dresser which dresses the grinding wheel.

The present invention can be suitably applied to, particularly, a grinding machine which is generally equipped with the dresser that permits the machining tool to be rectified within the machine.

(9) A cold-gas-blow-cooling type machining apparatus according to any one of modes (1) to (8), further comprising a relative movement device which moves the workpiece and the machining tool relative to each other, the relative movement device including a spindle which holds the workpiece and rotates the workpiece about an axis of the workpiece.

In the cold-gas-blow-cooling type machining apparatus recited in the present mode, the workpiece is held and rotated by the spindle. The rotated workpiece and the machining tool are moved relative to each other in at least one direction, whereby the workpiece is machined by the machining tool. The cold-gas-blow-cooling type machining apparatus of the present mode may be, for example, a lathe, or a grinding machine (e.g., a cylindrical grinding machine, an internal cylindrical grinding machine, and a centerless grinding machine).

The present invention is applicable to also other machine such as a surface grinding machine in which the workpiece is clamped on a magnetic table. However, the advantage of the present invention can be effectively enjoyed, particularly, in the present mode, since the sharpness of the machining tool is sensitively reflected on the temperature of the workpiece in the cylindrical grinding machine, internal cylindrical grinding machine or lathe in which the machining point is distant from a member or device holding the workpiece.

(10) A cold-gas-blow-cooling type machining apparatus according to any one of modes (1) to (9), wherein the rectifying device includes a rectifying tool which rectifies the machining tool, and a rectifying-tool moving device which moves the rectifying tool to a home position that is distant from the machining tool, and to an operating position in that the rectifying tool is in contact with the machining tool.

The rectifying tool is moved between the home position and the operating position, by the rectifying-tool moving device. The rectifying tool may be moved by a moving device which serves exclusively to move the rectifying tool, or alternatively may be moved by a workpiece moving device which serves also to move the workpiece. In the latter case, the relative movement device recited in mode (9) serves also as the rectifying-tool moving device.

(11) A cold-gas-blow cooling machining process of machining a workpiece attached to a spindle, by a machining tool, while providing a cold gas blow to cool the workpiece and the machining tool, the machining process being characterized by:

monitoring a temperature of the workpiece so as to rectify the machining tool at a point of time determined on the basis of the temperature.

It is possible to rectify the machining tool at the suitable time, by monitoring the temperature of the workpiece.

(12) A cold-gas-blow cooling machining process according to mode (11), wherein the machining tool is rectified when the temperature of the workpiece rises to a rectification requiring temperature.

(13) A cold-gas-blow cooling machining process according to mode (12), wherein the rectification requiring temperature is determined on the basis of a relationship between the temperature of the workpiece and a residual stress in the workpiece.

It is possible to obtain the rectification requiring temperature which corresponds to the desired residual stress value, for example, on the basis of the relationship of FIG. 4. Suppose that the point of time at which the detected temperature of the workpiece rises to the rectification requiring temperature is a machining-tool rectification time, the machining tool can be rectified at the point of time most suitable for the workpiece. Further, as in the above-described cold-gas-blow-cooling type machining apparatus, it is possible to automatically rectify the machining tool when the temperature of the workpiece rises to the rectification requiring temperature which is determined as the temperature corresponding to the inputted desired residual-stress-related value or values.

(14) A cold-gas-blow cooling machining process according to mode (12), wherein the rectification requiring temperature is determined on the basis of a relationship between the temperature and a machining resistance of the workpiece.

It is possible to obtain the rectification requiring temperature, which is the temperature of the workpiece at the time when the machining resistance is increased to its allowable value, on the basis of the relationship of FIG. 7. The machining tool is rectified at the time when the detected temperature of the workpiece rises to the rectification requiring temperature, thereby making it possible to restore the sharpness of the machining tool at the suitable point of time, and accordingly preventing an excessive increase in the machining resistance. Further, as in the above-described cold-gas-blow-cooling type machining apparatus, it is possible to automatically rectify the machining tool when the temperature of the workpiece rises to the rectification requiring temperature which is determined as the temperature corresponding to the inputted desired residual-stress-related value or values.

BEST MODE FOR CARRYING OUT THE INVENTION

One common embodiment of the present invention in the form of a cold-gas-blow-cooling type machining apparatus will be explained in detail on the basis of the drawings. This cold-gas-blow-cooling type machining apparatus is capable of carrying out a cold-gas-blow cooling machining process as one common embodiment of the present invention.

Figure 2:
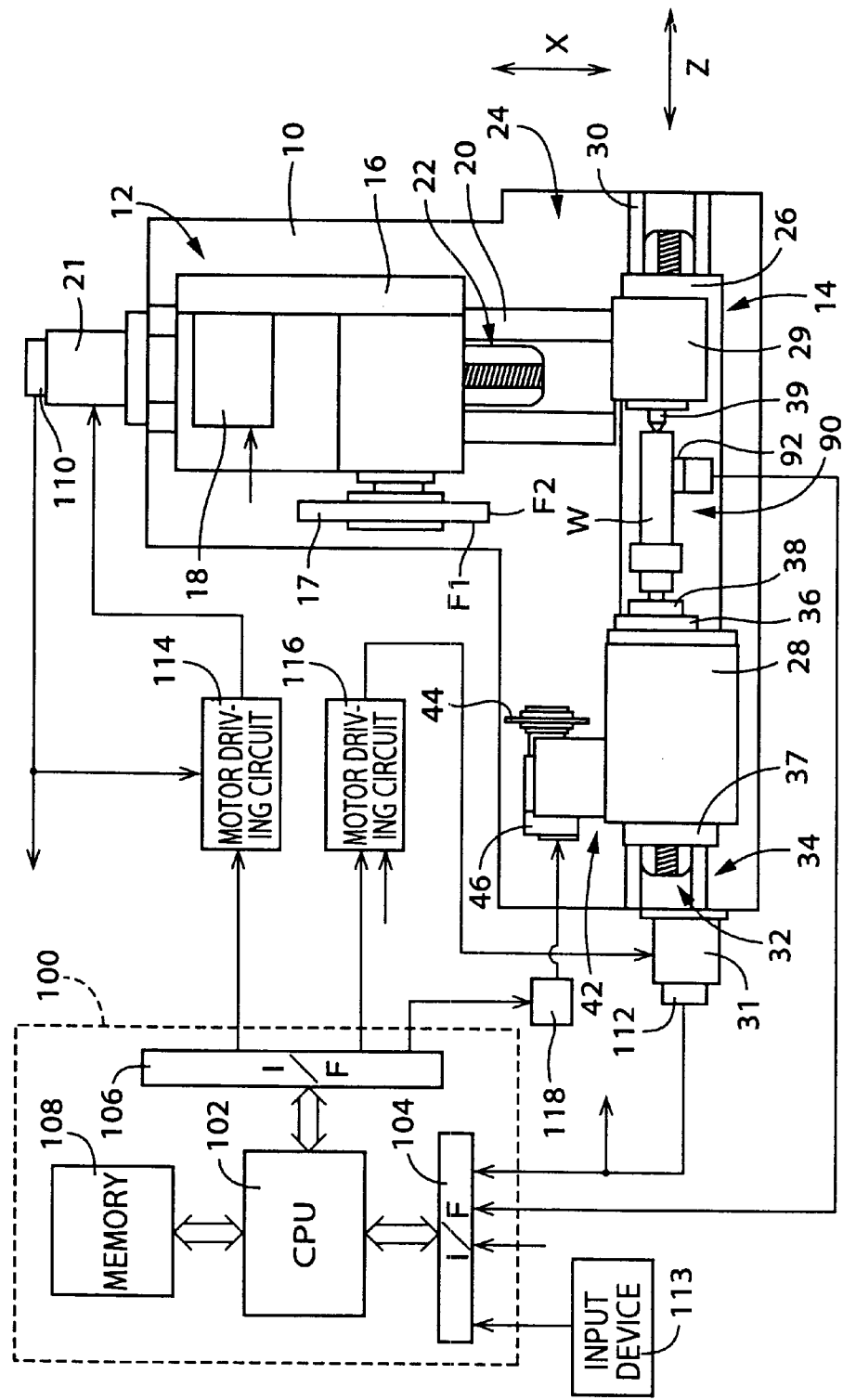
FIG. 2 is a plan view showing the entirety of the above-described cylindrical grinding machine.

FIG. 2 shows the entirety of a cylindrical grinding machine as the cold-gas-blow-cooling type machining apparatus. The cylindrical grinding machine has a bed 10 which includes a machining-tool supporting portion 12 and a workpiece supporting portion 14. The machining-tool supporting portion 12 includes a wheel spindle stock 16, a grinding wheel 17 mounted on the wheel spindle stock 16 and rotatable about its rotary axis, and an electric motor 18 serving to rotate the grinding wheel 17. On the bed 10, there is disposed a pair of rails 20 extending in the X-axis direction of the grinding machine. The wheel spindle stock 16 is moved along the rails 20 by a servo motor 21 via a feed screw device 22 which is driven by the servo motor 21. The rails 20, the servo motor 21 and the feed screw device 22 cooperate with each other to constitute a movement device 24.

The workpiece supporting device 14 includes a table 26 disposed on the bed 10 movably relative to the bed 10, a headstock 28 fixedly disposed on the table 26, and a tailstock 29 disposed on the table 26 movably toward and away from the headstock 28. The table 26 is movable along a pair of rails 30 disposed on the bed 10 and extending in the Z-axis direction of the grinding machine which is perpendicular to the above-described rails 20. The table 26 is moved in the Z-axis direction by a servo motor 31 via a feed screw device 32. The rails 30, the servo motor 31 and the feed screw device 32 cooperate with each other to constitute a movement device 34. On the headstock 28, there are mounted a spindle 36 and an electric motor 37 which rotates the spindle 36. A workpiece W is held by a workpiece holding portion 38 of the spindle 36 and a tailstock spindle 39 of the tailstock 29, so as to be rotatable about its axis. The workpiece W is a hardened steel in the present embodiment.

On the table 26, there is disposed a wheel dressing device 42 such that the wheel dressing device 42 is moved in the Z-axis direction together with the table 26. The wheel dressing device 42 includes a dressing tool 44 attached thereto rotatably about its rotary axis, and an electric motor 46 serving to rotate the dressing tool 44. While the workpiece W is ground, the wheel dressing device 42 is positioned in its home position which is distant from the grinding wheel 17. When a rectification operation is required to be performed, the wheel dressing device 42 is moved with the table 26 to its operating position in which the dressing tool 44 is in contact with the grinding wheel 17. The dressing tool 44 is capable of rectifying an axial end face F1 and an outer circumferential surface F2 of the grinding wheel 17. The wheel dressing device 42 may be fixed to the table 26 or the headstock 28. In the present embodiment, the movement device 34 serving to move the headstock 28 in the Z-axis direction serves also as a dressing-tool moving device which moves the dressing tool 44 in the Z-axis direction.

The grinding wheel 17 and the workpiece W are moved relative to each other by the movement of the wheel spindle stock 16 in the X-axis direction and the movement of the table 26 in the Z-axis direction, so that the outer circumferential surface of the workpiece W is ground. The present cylindrical grinding machine performs a traverse grinding in which the cylindrical workpiece W is ground over its entire axial length, and also a plunge grinding in which the workpiece W is ground at an axial part thereof. The plunge grinding is sometimes performed without any movement of the workpiece W in the Z-axis direction. However, the plunge grinding is generally performed with the movement of the workpiece W in the Z-axis direction as well as in the X-axis direction, although the movement amount in the Z-axis direction is small. The X-axis direction in which the wheel spindle stock 16 is moved is the direction of depth of cut where the traverse grinding is performed, and is the direction of feed where the plunge grinding is performed. The Z-axis direction in which the workpiece W is moved is the direction of feed where the traverse grinding is performed and also where the plunge grinding is performed.

Figure 1:
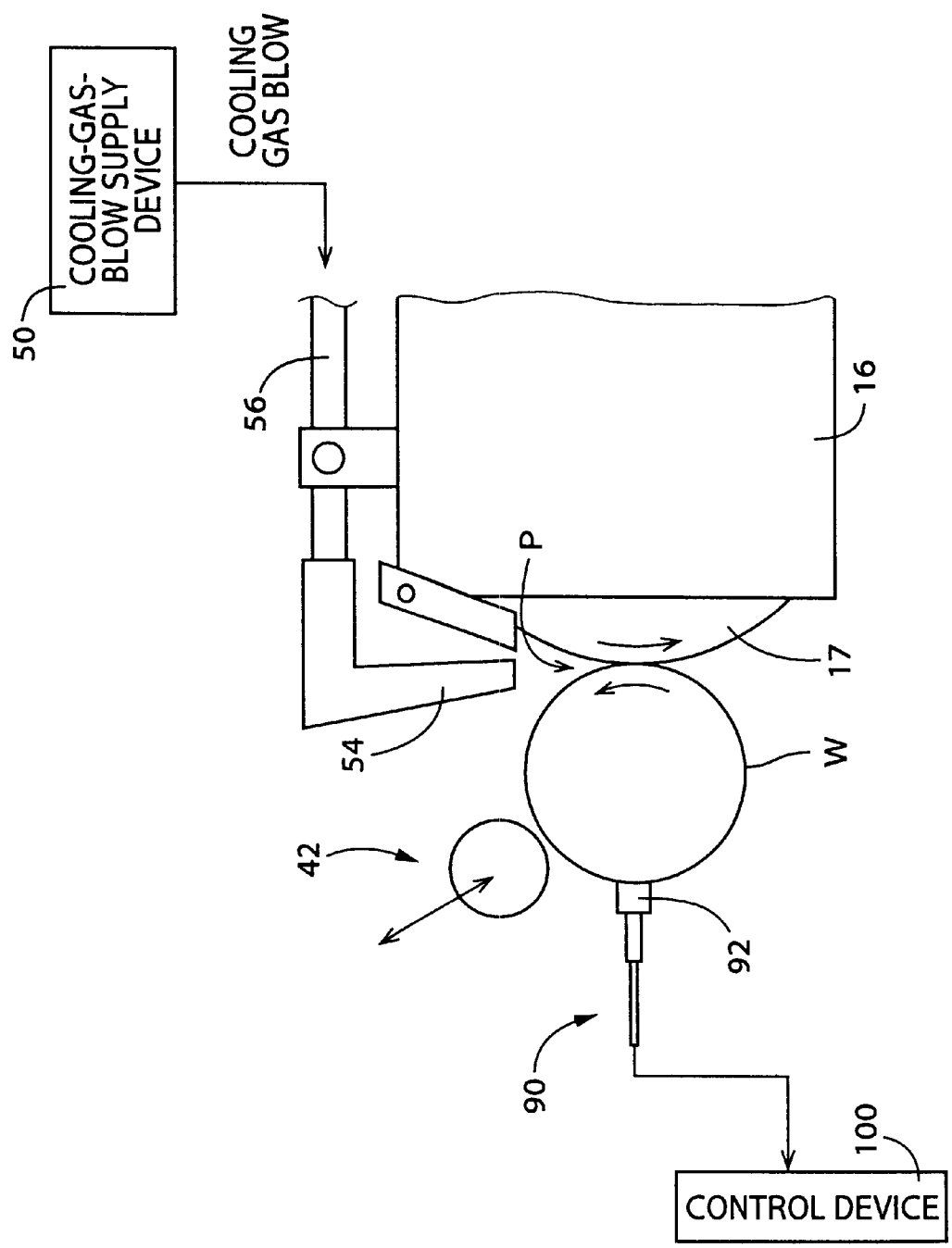
FIG. 1 is a view schematically illustrating an essential part of a cold-gas-blow-cooling type machining apparatus in the form of a cylindrical grinding machine according to one embodiment of the present invention.
Figure 3:
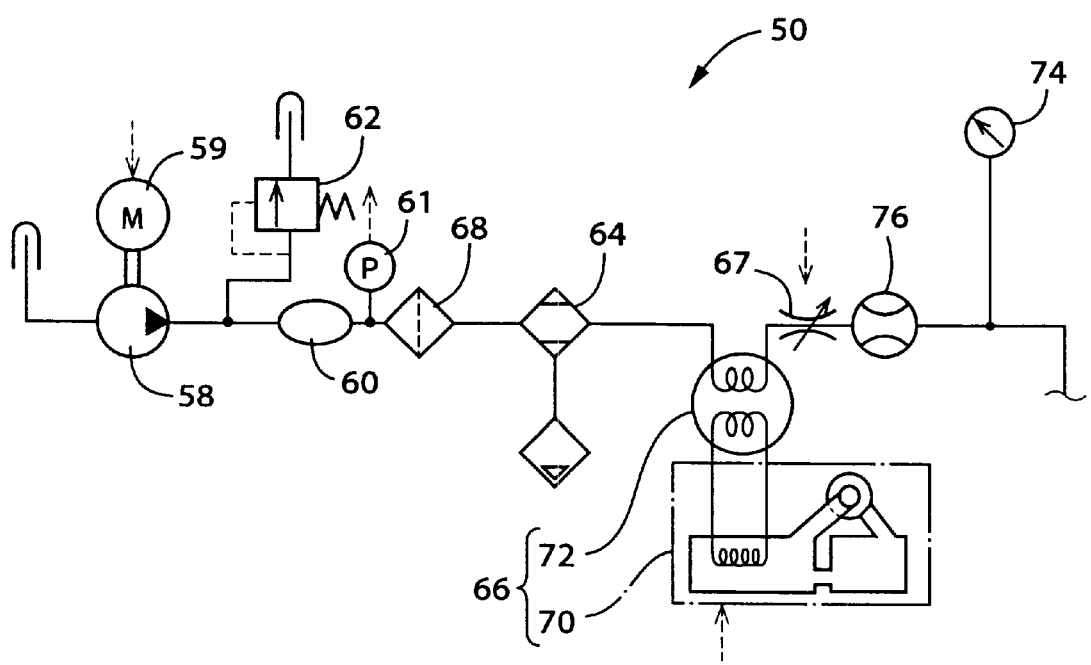
FIG. 3 is a circuit diagram showing a gas supply device which is included in the above-described cylindrical grinding machine.

The present cylindrical grinding machine is equipped with a cold-gas-blow supply device in the form of a cooling-gas-blow supply device 50, as shown in FIG. 1. The cooling-gas-blow supply device 50 supplies a cooling gas blow to a grinding point P at which the workpiece W is ground by the grinding wheel 17. The cooling-gas-blow supply device 50 is connected to a conduit 56, and a grinding cooling nozzle 54 is attached to the distal end of the conduit 56. The grinding cooling nozzle 54 is located above the grinding point P, so that the cooling gas blow is supplied downward from the grinding cooling nozzle 54 toward the grinding point P. The cooling-gas-blow supply device 50 is adapted to suck and compress the ambient air thereby cooling the air, and includes a pump 58, a motor 59 for driving the pump 58, a tank 60, a pressure switch 61 for detecting a pressure of the air accumulated in the tank 60, a relief valve 62, a drier 64, a cooling device 66 and a flow regulating valve 67, as shown in FIG. 3.

The air compressed by the pump 58 is accumulated in the tank 60 which serves to minimize a pulsating flow of the air. The motor 59 for driving the pump 58 is controlled depending upon the state of the pressure switch 61, such that the pressure of the air accumulated in the tank 60 is held within a predetermined range. In the present embodiment, when the pressure of the air in the tank 60 falls below a lower limit of the predetermined range, the pressure switch 61 is switched from its ON state to its OFF state. The switching of the pressure switch 61 from the ON state to the OFF state causes the motor 59 to be turned on. When the pressure of the air is raised to an upper limit of the predetermined range, the pressure switch 61 is switched from the OFF state to the ON state, whereby the motor 59 is turned off. The relief valve 62 is provided to prevent the pressure of the compressed air delivered from the pump 58, from being excessively increased. The air supplied from the tank 60 flows through a filter 68 and the drier 64, and is then cooled by the cooling device 66 which includes a refrigerating cycle 70 and a heat exchanger 72. A coolant is forced to be cooled by the refrigerating cycle 70, and the air passing through the heat exchanger 72 is cooled such that the temperature of the air is lowered to a predetermined temperature. In the heat exchanger 72, the air may be cooled directly by the coolant, or alternatively may be cooled by a fluid which has been cooled by the coolant. By controlling the temperature of the coolant cooled in the refrigerating cycle 70, or by controlling amount of the coolant circulating through the refrigerating cycle 70, for example, it is possible to control the temperature of the air passing through the heat exchanger 72. The air which has passed through the heat exchanger 72 is supplied to the grinding point P, flowing through the flow regulating valve 67, the conduit 56 and the grinding cooling nozzle 54. The rate of flow of the cooling air supplied from the grinding cooling nozzle 54 is controlled by controlling the flow regulating valve 67. The pressure and flow rate of the air flowing through the conduit 56 are detected by a pressure gage 74 and a flow meter 76, respectively. Thus, the cooling-gas-blow supply device 50 serves to supply the air or gas in the form of a cold gas blow, and the flow rate and the temperature of the supplied cold gas blow are controllable by the flow regulating valve 67 and the cooling device 66, respectively.

The pressure switch 61 may be replaced by a pressure sensor, so that the activation of the motor 59 is controlled on the basis of the pressure of the air detected by the pressure sensor. Also in this case, the pressure of the air accumulated in the tank 60 can be held within the predetermined range. Further, the cooling-gas-blow supply device 50 may be adapted to supply the air of a constant temperature at a constant flow rate. That is, the flow rate and temperature of the air do not necessarily have to be controllable.

A temperature t on the outer circumferential surface of the workpiece W is detected by a temperature detecting device 90 including a detecting portion 92 opposed to a point that lies on a circle on which the grinding point P lies. It is noted that the grinding point P is a point on the outer circumferential surface of the workpiece W. The detecting portion 92 may be of a contact type so as to be brought in contact with the outer circumferential surface of the workpiece W thereby detecting the surface temperature t, or alternatively may be of a non-contact type so as to detect the surface temperature t on the basis of a radiant energy radiated from the workpiece. Since the temperature detecting device 90 detects the temperature at the point lying on the circle on which the grinding point P lies, the temperature rise during the grinding operation can be immediately and accurately detected. Further, since the temperature in the vicinity of the grinding point P sensitively reflects the condition of the sharpness of the machining tool, it is preferable that the temperature in the vicinity of the grinding point P be detected. The temperature detecting device 90 is provided movably relative to the table 26. In the present embodiment, the temperature t of the workpiece W is detected at a predetermined time interval.

The present cylindrical grinding machine is controlled by a control device 100 which is principally constituted by a computer including a CPU 102, an input interface (I/F) 104, an output interface 106 and a memory 108. To the input I/F 104, there are connected the temperature detecting device 90, rotary encoders 110, 112 and an input device 113. The rotary encoders 110 detects the rotational shaft position of the servo motor 21, while the rotary encoders 112 detects the rotational shaft position of the servo motor 31. The input device 113 includes a mouse and a keyboard which are not shown. To the output I/F 106, there are connected the servo motors 21, 31 and the electric motor 46 through driving circuits 114, 116, 118, respectively. The memory 108 has stored therein various programs such as a grinding-wheel-rectification control program, which is executed for controlling the wheel dressing device 42 as shown in a flow chart of FIG. 5.

The operation of the above-described cylindrical grinding machine will be explained.

The workpiece W is ground as a result of relative movements of the grinding wheel 17 and the workpiece W in the X-axis and Z-axis directions. While the workpiece W is ground, the cooling gas blow is supplied downward to the grinding point P from the cooling-gas-blow supply device 50, so that the grinding point P is cooled. In the present embodiment, the cooling gas blow having a predetermined temperature is supplied at a predetermined flow rate to the grinding point P. The temperature t on the outer circumferential surface of the workpiece W subjected to the grinding operation is detected by the temperature detecting device 90, and a signal representative of the detected temperature t is then inputted to the control device 100. In the control device 100, it is judged whether the temperature t has risen to a rectification requiring temperature T or not. Where the temperature t has risen to the rectification requiring temperature T at which the rectification is required, a rectification command is generated.

Figure 4:
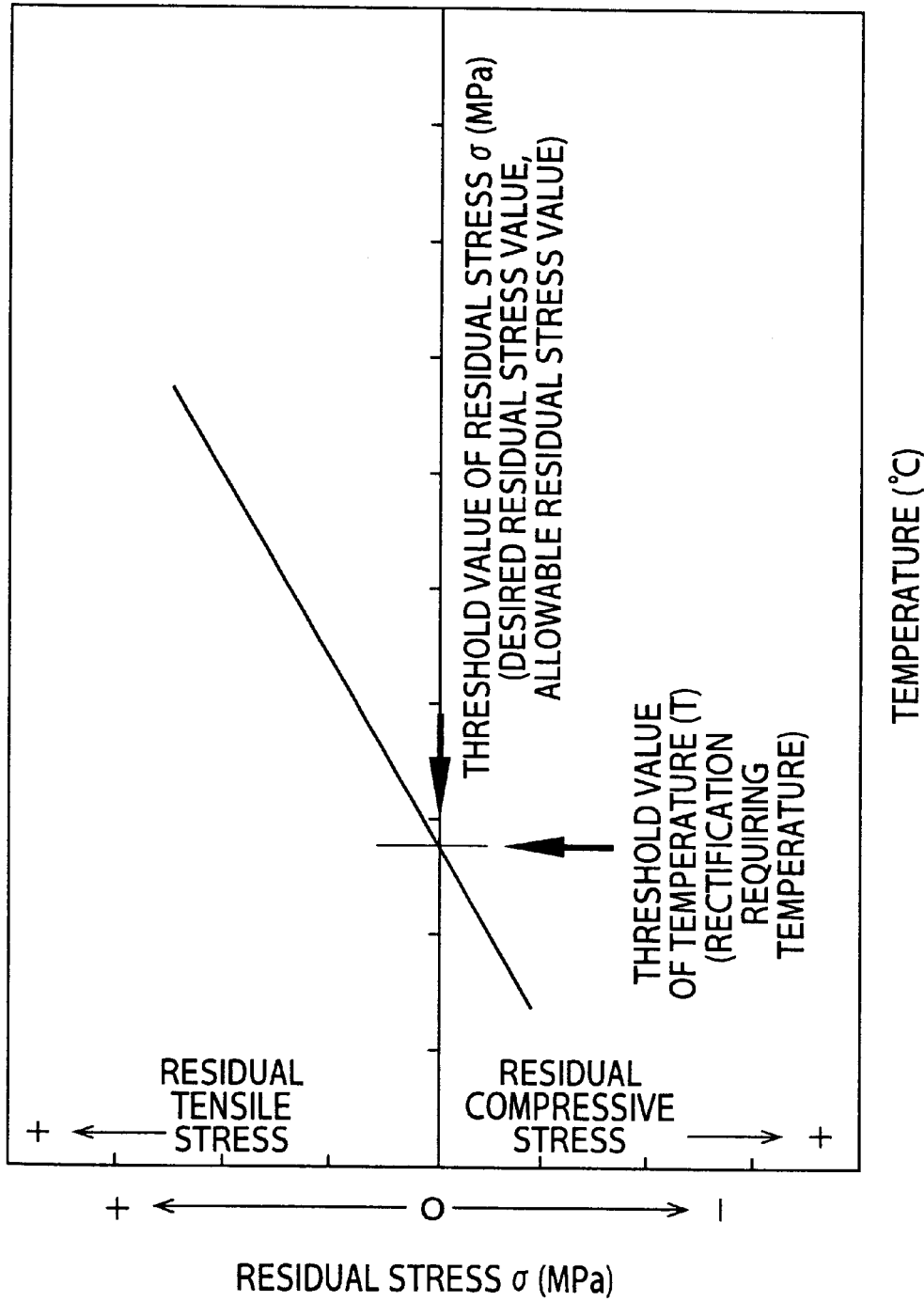
FIG. 4 is a view showing a relationship between the temperature of a workpiece which is ground by the above-described cylindrical grinding machine, and a residual stress in the workpiece.

The workpiece W which is ground by the cylindrical grinding machine of the present embodiment is a steel hardened by a heat treatment. Thus, before the grinding operation, the workpiece W has therein a residual compressive stress which has been increased by the heat treatment. The residual compressive stress is reduced with a rise of the temperature of the workpiece caused by the grinding operation. (The residual compressive stress is reduced while the residual tensile stress is increased.) The reduction in the residual compressive stress leads to a reduction in fatigue strength of the workpiece and a consequently increased possibility of fatigue failure of the workpiece. Deterioration of the sharpness of the grinding wheel 17 during the grinding operation causes a gradual increase in a load (e.g. grinding resistance, frictional resistance) applied to the workpiece W and a consequent temperature rise on the outer circumferential surface of the workpiece. In this view, the grinding wheel 17 is rectified on the basis of the temperature of the workpiece, so as to restore its sharpness. Thus, it is possible to prevent the residual stress in the workpiece after the grinding operation, from exceeding the allowable value. In the present embodiment, the operation of the wheel dressing device 42 is initiated at the time when the detected temperature t of the workpiece W rises to the rectification requiring temperature T, which corresponds to the allowable value of the residual stress as shown in FIG. 4. In the present embodiment, the allowable value of the residual stress is set to zero. The rectification requiring temperature T corresponding to the allowable value of the residual stress is previously inputted to the control device 100 by the operator through the input device 113.

Figure 5:
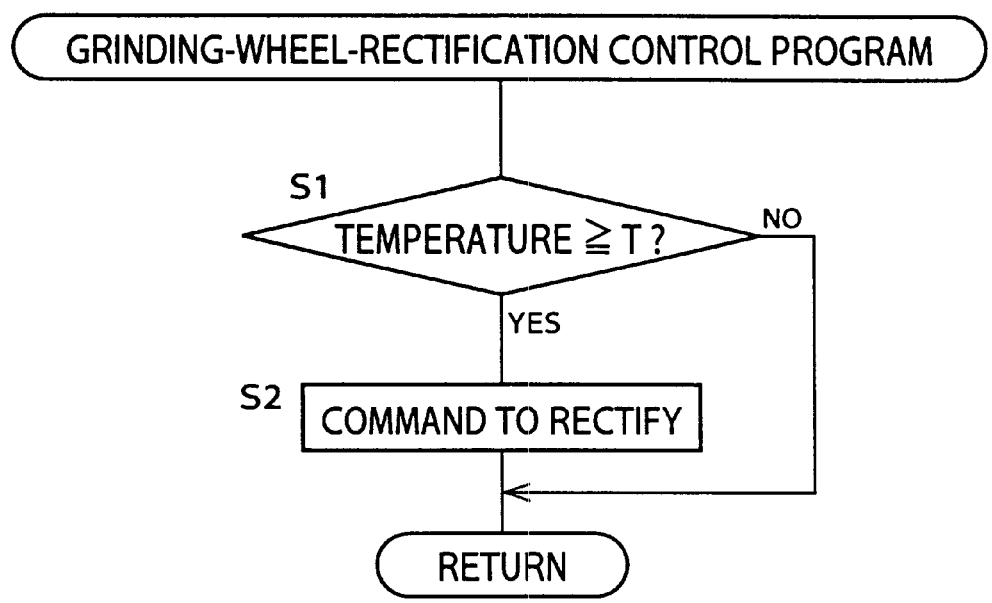
FIG. 5 is a flow chart showing a grinding-wheel-rectification control program stored in ROM of a control device which is included in the above-described cylindrical grinding machine.

As shown in the flow chart of FIG. 5, the temperature signal representative of the temperature of the workpiece W detected by the temperature detecting device 90 is inputted to the control device 100 at S1, so as to determine whether the surface temperature t represented by the temperature signal is equal to or higher than the rectification requiring temperature T at S1. If the detected temperature t is lower than the rectification requiring temperature T, a negative determination is obtained at S1, whereby the grinding operation is continued. If the detected temperature t is equal to or higher than the rectification requiring temperature T, a positive determination is obtained at S1, whereby S1 is followed by S2. At S2, the dressing command is generated, and the grinding wheel 17 is then rectified in response to the dressing command. The wheel spindle stock 16 and the table 26 are moved by the controlled servo motors 21, 31, respectively, to the respective positions in which the grinding wheel 17 and the dressing tool 44 are opposed to each other. That is, the table 26 is moved rightward as viewed in the figure, while the wheel spindle stock 16 is moved forward. The grinding wheel 17 and the dressing tool 44 are thus moved relative to each other, with the grinding wheel 17 being rotated, whereby the grinding wheel 17 is rectified. Where the traverse grinding is executed, the outer circumferential surface F2 is rectified. Where the plunge grinding is executed, at least one of the outer circumferential surface F2 and the axial end face F1 is rectified.

After the rectification operation, the workpiece W is ground by the relative movement of the workpiece W and the grinding wheel 17. Since the grinding wheel 17 has restored its sharpness, the load applied to the workpiece W (e.g. frictional resistance) is small.

Figure 6:
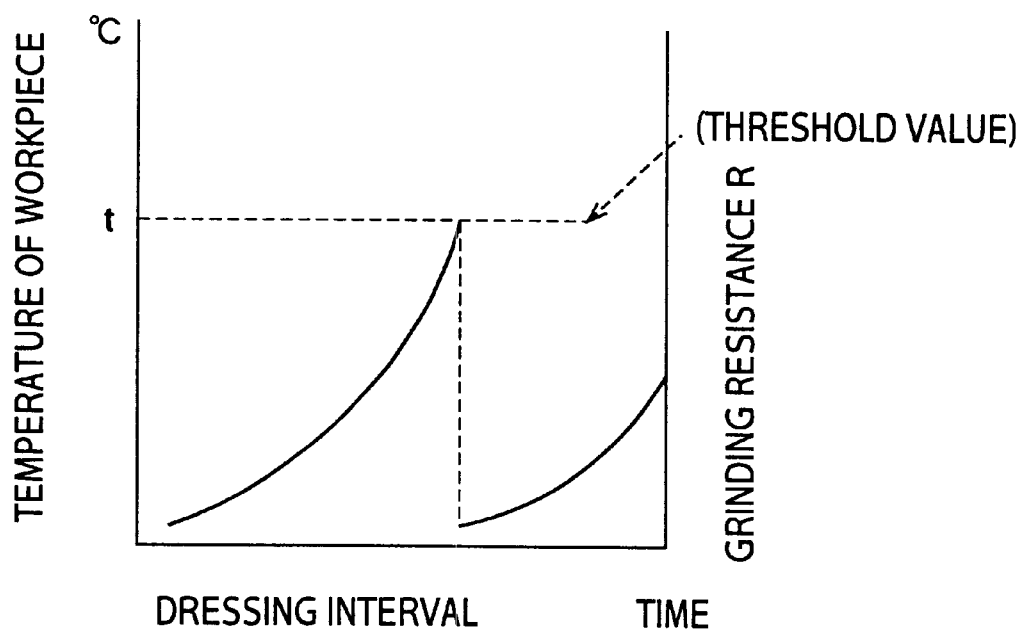
FIG. 6 is a view showing one example of the control in the above-described cylindrical grinding machine.

The temperature t on the outer circumferential surface of the workpiece W rises again as the grinding operation proceeds. When the temperature t rises to the rectification requiring temperature T corresponding to the allowable value of the residual stress, the grinding wheel 17 is rectified in the same manner as described above. The rectification of the grinding wheel 17 is performed cyclically, as shown in FIG. 6.

In the present embodiment wherein the grinding wheel 17 is rectified on the basis of the temperature t of the workpiece W, namely, on the basis of a factor derived from the workpiece, as described above, the grinding wheel 17 is rectified at the points of time suitable for the workpiece. Further, since the temperature t of the workpiece at which the grinding wheel 17 is rectified is determined depending upon the allowable value of the residual stress, the residual stress in the workpiece W after the grinding operation can be prevented from being larger than zero, i.e., the allowable value of the residual stress. It is noted that the allowable value of the residual stress does not necessarily have to be set to zero, but may be any other desired value. By inputting the rectification requiring temperature T, which corresponds to the desired residual stress value, to the control device 100, it is possible to suitably change the residual stress in the ground workpiece, depending upon the purpose of use of the workpiece or some other factors. Further, since the temperature detecting device 90 detects the temperature in the vicinity of the grinding point P which temperature immediately reflects deterioration of the sharpness of the grinding wheel 17, it is possible to prevent a delayed operation to rectify the grinding wheel 17. It is noted that the relationship shown in FIG. 4 varies depending upon the physical characteristics and surface treatment of the workpiece, the grinding condition (including the cooling condition) and some other factors. It is preferable to change the relationship upon each change in the material of the workpiece or the grinding condition.

Figure 7:
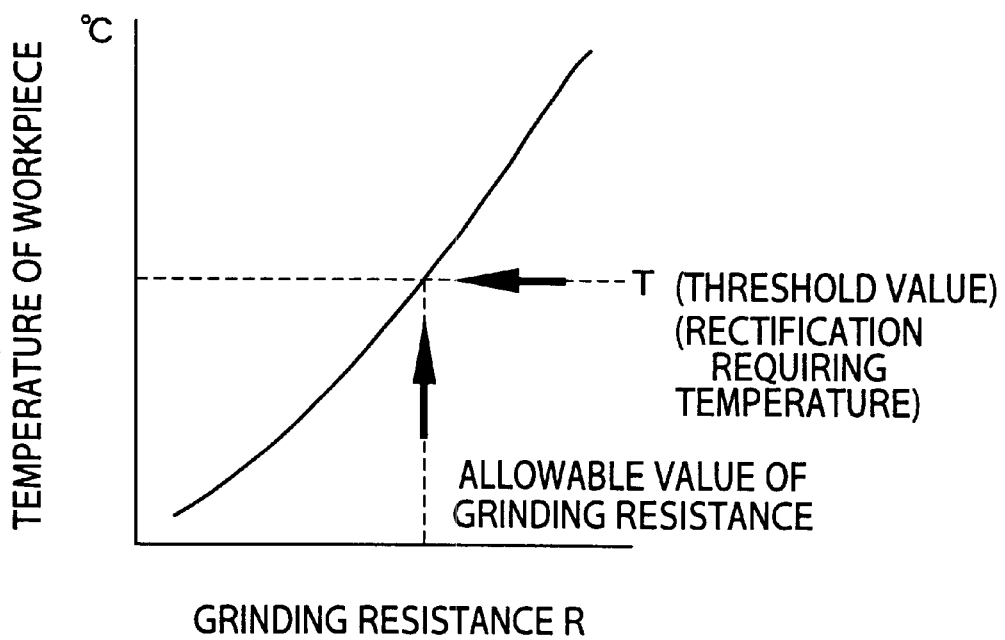
FIG. 7 is a view showing a relationship between the temperature of the workpiece which is ground by the above-described cylindrical grinding machine, and a grinding resistance of the workpiece.

Further, the rectification requiring temperature T may be determined also on the basis of a relationship between the temperature of the workpiece and the grinding resistance, as shown in FIG. 7. The temperature of the workpiece rises with an increase of the grinding resistance due to deterioration of the sharpness of the grinding wheel 17, as is clear from the figure. The rectification requiring temperature T corresponding to an allowable value of the grinding resistance is determined on the basis of the relationship, and then the determined rectification requiring temperature T is inputted to the control device 100 in advance. The grinding wheel 17 is rectified at the time when the temperature t of the workpiece has become equal to or higher than the rectification requiring temperature T corresponding to the allowable value of the grinding resistance, thereby preventing an excessively increased grinding resistance and an accordingly high temperature of the workpiece. Thus, it is possible to minimize deterioration of the accuracy of the workpiece after the grinding operation.

In the present embodiment, the wheel dressing device 42 and the movement devices 24, 34 constitute a major part of a rectifying device. A portion of the control device 100 which controls the wheel dressing device 42 and the movement devices 24, 34 (i.e., a portion of the control device 100 which stores therein the grinding-wheel-rectification control program and executes the control program) constitutes a major part of a rectifying-device control device. The rectifying-device control device includes a rectifying-operation command portion which provides the rectifying command (i.e., a portion which stores S2 therein and implements S2). The rectifying-device control device further includes a comparing portion which determines whether the temperature of the workpiece W detected by the temperature detecting device 90 is equal to or higher than the rectification requiring temperature or not (i.e., a portion which stores S1 therein and implements S1). The rectifying-operation command portion and the comparing portion may be constituted by a hardware circuit arrangement.

In the above-illustrated embodiment, the rectification requiring temperature T is inputted to the control device 100, directly, by the operator. However, it is also possible to previously store in the memory 108 a table represented by the graph of FIG. 4, so that the rectification requiring temperature T is determined according to the stored table when the desired residual stress value is inputted to the control device 100 by the operator. In this case, the data inputted by the operator is not limited to the desired residual stress value, but may be information indicating that the desired residual stress value is large or small, or alternatively information indicating whether the desired residual stress value should be taken into account or not. Further, it is also possible to store in the memory 108 a table represented by the graph of FIG. 7, so that the rectification requiring temperature T is determined according the table. Still further, in the cylindrical grinding machine, it is possible to control the servo motors 21, 32 such that the relative movement velocity of the workpiece W and the grinding wheel 17, or the depth of cut per pass is reduced each time the temperature of the workpiece W rises to a predetermined temperature. While the cold-gas-blow-cooling type machining apparatus of the present invention is applicable to the cylindrical grinding machine as described in the above-illustrated embodiment, the cold-gas-blow-cooling type machining apparatus is applicable also to a cutting machine in which a cutting tool is employed as the machining tool. In this case, the cutting tool is rectified. Further, the workpiece does not have to be a hardened steel, and may be made of any other metallic material.

While the embodiments of the present invention have been described above for illustrative purpose only, it is to be understood that the present invention may be embodied in the modes as described above (in the DISCLOSURE OF INVENTION), and with various changes and modifications, which may occur to those skilled in the art.

What is claimed is:

1. A cold-gas-blow-cooling machining apparatus in which a cold gas blow is provided to cool a machining tool and a workpiece while said workpiece is machined by said machining tool, said machining apparatus being characterized by comprising:

a rectifying device which rectifies said machining tool;

a workpiece-temperature detecting device which detects a temperature of said workpiece; and a rectifying-device control device which controls an operation of said rectifying device on the basis of said temperature of said workpiece which is detected by said workpiece-temperature detecting device.

2. A cold-gas-blow-cooling machining apparatus according to claim 1, wherein said rectifying-device control device includes a rectifying-operation command portion which commands said rectifying device to rectify said machining tool when said temperature of said workpiece rises to a rectification requiring temperature.

3. A cold-gas-blow-cooling machining apparatus according to claim 2, wherein said rectifying-device control device includes a mechanical-property-basis determining portion which determines said rectification requiring temperature on the basis of a relationship between said temperature of said workpiece and a mechanical property of said workpiece.

4. A cold-gas-blow-cooling machining apparatus according to claim 3, wherein said mechanical property includes a residual stress in a surface layer portion of said workpiece.

5. A cold-gas-blow-cooling machining apparatus according to claim 2, wherein said rectifying-device control device includes a machining-resistance-basis determining portion which determines said rectification requiring temperature on the basis of a relationship between a machining resistance applied to said machining tool from said workpiece and said temperature of said workpiece.

6. A cold-gas-blow-cooling machining apparatus according to claim 1, wherein said workpiece-temperature detecting device includes a detecting portion opposed to a vicinity of a machining point at which said workpiece is machined by said machining tool.

7. A cold-gas-blow-cooling machining apparatus according to claim 6, further comprising a spindle which holds said workpiece and rotates said workpiece about an axis of said workpiece, and wherein said detecting portion is opposed to a point that lies on a circle on which said machining point lies and that is spaced apart from said machining point circumferentially of said workpiece, said circle having a center on said axis.

8. A cold-gas-blow-cooling machining apparatus according to claim 6, wherein said detecting portion is opposed to a portion of said workpiece which is adjacent to said machining point and which is on a downstream side of said machining point as viewed in a direction in which a surface of said workpiece and said machining tool are moved relative to each other.

9. A cold-gas-blow-cooling machining apparatus according to claim 1, further comprising a rotary driving device, and wherein said machining tool includes a grinding wheel which is rotated by said rotary driving device, and wherein said rectifying device includes a dresser which dresses said grinding wheel.

10. A cold-gas-blow-cooling machining apparatus according to claim 1, further comprising a relative movement device which moves said workpiece and said machining tool relative to each other, said relative movement device including a spindle which holds said workpiece and rotates said workpiece about an axis of said workpiece.

11. A cold-gas-blow-cooling machining apparatus according to claim 1, wherein said rectifying device includes a rectifying tool which rectifies said machining tool, and a rectifying-tool moving device which moves said rectifying tool to a home position that is distant from said machining tool, and to an operating position in that said rectifying tool is brought in contact with said machining tool.

12. A cold-gas-blow-cooling machining apparatus according to claim 1, wherein said rectifying-device control device includes a machining-condition lightening portion which reduces a velocity of relative movement of said machining tool and said workpiece by a predetermined amount each time said temperature rises to a predetermined temperature, and a rectifying-operation command portion which commands said rectifying device to rectify said machining tool when said velocity is reduced to a predetermined velocity.

13. A cold-gas-blow-cooling machining apparatus according to claim 1, wherein said rectifying-device control device includes a machining-condition lightening portion which reduces a depth of cut in said workpiece with said machining tool, by a predetermined amount, each time said temperature rises to a predetermined temperature, and a rectifying-operation command portion which commands said rectifying device to rectify said machining tool when said depth of cut is reduced to a predetermined depth of cut.

14. A cold-gas-blow cooling machining process of machining a workpiece attached to a spindle, by a machining tool, while providing a cold gas blow to cool said workpiece and said machining tool, said machining process being characterized by comprising:

a step of monitoring a temperature of said workpiece so as to rectify said machining tool at a point of time determined on the basis of said temperature.

15. A cold-gas-blow cooling machining process according to claim 14, wherein said machining tool is rectified when said temperature of said workpiece rises to a rectification requiring temperature.

16. A cold-gas-blow cooling machining process according to claim 15, wherein said rectification requiring temperature is determined on the basis of a relationship between said temperature of said workpiece and a residual stress in said workpiece.

17. A cold-gas-blow cooling machining process according to claim 15, wherein said rectification requiring temperature is determined on the basis of a relationship between said temperature and a machining resistance of said workpiece.

* * * * *